UNITED STATES PATENT OFFICE.

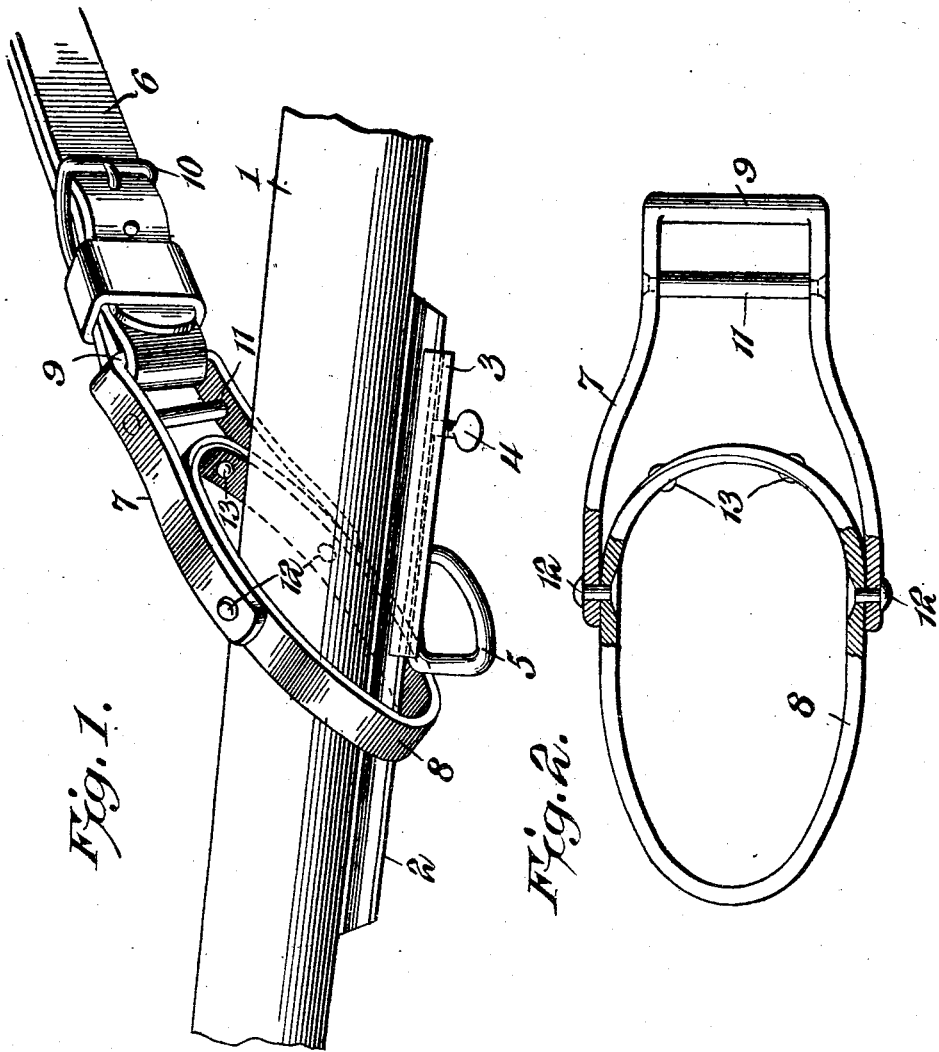

AUGUST FRED TANK, OF SANDUSKY, MICHIGAN.

HOLDBACK.

968,288.  Specification of Letters Patent.  Patented Aug. 23, 1910.

Application filed April 7, 1910. Serial No. 554,036.

*To all whom it may concern:*

Be it known that I, AUGUST F. TANK, a citizen of the United States, residing at Sanusky, in the county of Sanilac and State of Michigan, have invented a new and useful Holdback, of which the following is a specification.

My invention relates to improvements in holdbacks, and has for its object the provision of a device of simple construction which will efficiently perform the functions of holding back the thills of a vehicle when the same is being drawn over a down-grade and which at the same time may be readily detached from the thills when it is desired to release the draft animal from the vehicle.

A further object of the invention is to provide a holdback which will not wear upon and deface the vehicle thills.

Another object of the invention is to provide a holdback which may be readily applied to any harness without requiring the provision of any particular form of straps or buckles.

These stated objects and such other objects as will hereinafter incidentally appear are attained in the use of the device illustrated in the accompanying drawings, and the invention consists in certain novel features of the same which will be hereinafter first fully described and then particularly pointed out in the appended claims.

In the drawings, Figure 1 is a perspective view of a holdback embodying my invention. Fig. 2 is a rear elevation of the holdback loop.

In carrying out my invention, I secure to the under side of the thill 1 a guide or block 2 upon which is mounted a slide 3 held at any desired point of the guide by a set screw 4 and provided at its front end with a lug or depending projection 5 constituting the holdback stop.

The harness is equipped with a strap 6 extending to the breeching and passing through a U-shaped casting 7 to and between the ends of which I secure a leather loop 8 adapted to encircle the thill, as clearly shown in Fig. 1. The strap 6 is passed around the cross bar 9 at the end of the casting 7 and is secured by a buckle 10 of any convenient form. A pin or cross bar 11 is secured rigidly between the sides of the casting 7 near the end of the same so as to prevent the strap 6 becoming excessively freed from the shoulder or cross bar 9 and also to prevent contact between the strap and the loop 8. The loop 8 is secured to and between the ends of the arms of the casting 7 by rivets 12 so as to be permanently attached thereto, and the ends of the strap constituting the loop are secured permanently together by similar rivets 13, as will be readily understood.

The loop 8 is fitted over the thill when the draft animal is being harnessed to the vehicle and will readily conform to the outline of the thill and accommodate itself to the guide 2 and the holdback stop 5, so that when the animal is holding back on the vehicle, as for instance when on a down-grade, the holdback stop will engage the loop and the holding force will be thereby transmitted to the thills and through the same to the vehicle. The casting 7 will hold the loop sufficiently distended to facilitate the application of the same to the thills and the flexible character of the loop will not only permit it to accommodate itself to the size or shape of the thill, but will also present a yieldable surface to the surface of the thill so that marring and defacing of the thill will be prevented.

The device is obviously simple and inexpensive and may be readily applied to any harness and thills.

It will be noticed that the loop is not in fixed engagement with the thill but may slide freely on the same so that should it be necessary to release the animal from the vehicle, no manipulation of the holdback is necessary but it is sufficient to allow the animal to walk from between the thills, whereupon the loop 8 will slide forward over the same and pass from the ends thereof.

The advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. The combination of a rigid U-shaped frame, and an endless flexible loop arranged between and rigidly secured to the free ends of the frame and adapted to loosely encircle a thill, and a holding strap inserted through the frame between the closed end of the same and the loop.

2. The combination of a U-shaped frame having a cross bar near its closed end, a holding strap inserted through the frame between the closed end of the same and the said cross bar, and a flexible loop rigidly secured to and between the free ends of the said frame and adapted to encircle a thill.

In testimony, that I claim the foregoing as my own, I have hereto affixed my signature in the presence of two witnesses.

AUGUST FRED TANK.

Witnesses:
  JESSE GLEASON,
  O. A. MUNN.